United States Patent [19]

Stamm et al.

[11] Patent Number: 5,896,220
[45] Date of Patent: Apr. 20, 1999

[54] PRODUCTION OF NARROW-BAND COHERENT RADIATION BY USING AT LEAST ONE OPTICAL PARAMETRIC OSCILLATOR

[75] Inventors: Uwe Stamm; Ingo Klaft, both of Göttingen; Stefan Borneis, Fulda; Vadim Berger, Göttingen; Peter Lokai, Bovenden, all of Germany

[73] Assignee: Lambda Physik Gessellschaft Zur. Herstellung Von Lasern MBH, Germany

[21] Appl. No.: 08/906,523

[22] Filed: Aug. 5, 1997

[30] Foreign Application Priority Data

Aug. 23, 1996 [DE] Germany ............ 196 34 161

[51] Int. Cl.[6] .................................... G02F 1/39
[52] U.S. Cl. .......................................... 359/330
[58] Field of Search ......................... 359/326–332

[56] References Cited

U.S. PATENT DOCUMENTS

| 5,033,057 | 7/1991 | Bosenberg et al. ............ 372/72 |
| 5,053,641 | 10/1991 | Cheng et al. .................. 359/330 |
| 5,365,366 | 11/1994 | Kafka et al. ................... 359/330 |
| 5,457,707 | 10/1995 | Sobey et al. ................... 372/20 |
| 5,659,419 | 8/1997 | Lokai et al. ................... 359/330 |
| 5,663,973 | 9/1997 | Stamm et al. ............... 359/330 X |
| 5,671,241 | 9/1997 | Stamm et al. ............... 359/330 X |
| 5,796,513 | 8/1998 | Stamm et al. ............... 359/330 |

FOREIGN PATENT DOCUMENTS 42 19 169 A1  6/1992  Germany ............ H01S 3/10

OTHER PUBLICATIONS

W.R. Bosenberg & D.R. Guyer, "Broadly tunable, single–frequency optical parametric frequency–conversion system," J. Opt. Soc. Am. B, vol. 10, No. 9, Sep. 1993, pp. 1716–1722.

A. Fix, T. Schröder & R. Wallenstein, "Tunable β–barium borate optical parametric oscillator: operating characteristics with and without injection seeding," J. Opt. Soc. Am. B, vol. 10, No. 9, Sep. 1993, pp. 1744–1750.

V. Petrov and F. Noack, "Frequency upconversion of tunable femtosecond pulses by parametric amplification and sum–frequency generation in a single nonlinear crystal", Nov. 1, 1995, vol. 20, No. 21, OPTICS LETTERS, pp. 2171–2173.

J.M. Boon–Engering, W.E. van der Veer, and J.W. Gerritsen, "Bandwidth studies of an injection–seeded β–barium borate optical parametric oscillator", OPTICS LETTERS, vol. 20, No. 4, Feb. 15, 1995, pp. 380–382.

M.J. Johnson, J.G. Haub, and B.J. Orr, "Continuously tunable narrow–band operation of an injection–seeded ring–cavity optical parametric oscillator: spectroscopic applications". Jun. 1, 1995, vol. 20, No. 11, OPTICS LETTERS, pp. 1277–1279.

Primary Examiner—John D. Lee
Attorney, Agent, or Firm—Limbach & Limbach L.L.P.

[57] ABSTRACT

A source of narrow-band coherent radiation has a first optical parametric oscillator (OPO 1) for producing seed radiation, and a second optical parametric oscillator (OPO 2), into which the seed radiation is input after passing through a wavelength-selective element (G). In order to stabilize and adjust the bandwidth of the radiation (14) emitted by the second optical parametric oscillator (OPO 2), radiation of this type is also input into the wavelength-selective element (G) and thereby analyzed, in order, in accordance with the analysis, to adjust the wavelength-selective element or the OPO 2.

14 Claims, 2 Drawing Sheets

PRODUCTION OF NARROW-BAND COHERENT RADIATION BY USING AT LEAST ONE OPTICAL PARAMETRIC OSCILLATOR

The invention relates to a method for adjusting narrow-band coherent radiation, having the features of the precharacterizing clause of Patent claim 1, and also to a device (source) for producing narrow-band coherent radiation, having the features of the precharacterizing clause of Patent claim 2, that is to say by using at least one tunable optical parametric oscillator (OPO). A method according to the precharacterizing clause of Patent claim 1, and a source according to the precharacterizing clause of claim 2, are disclosed by DE 42 19 169 A1.

The principle of optical parametric oscillation has been known since 1965 (J. A. Giordmaine and R. C. Miller). If the optical parametric amplifier medium inside the resonator is excited by the so-called pump radiation, then radiation with two different wavelengths is produced by frequency mixing. A typical pump radiation is the third harmonic of an Nd:YAG laser, which has a wavelength of 355 nm. The short-wave radiation produced in the amplifier medium by frequency mixing is referred to as signal radiation, and the longer-wavelength radiation is referred to as idler radiation. The conservation of energy dictates that the sum of the frequencies of the signal and idler radiation is equal to the frequency of the pump radiation. The wavelengths of the signal and idler radiation can be tuned by changing the so-called phase matching. For a given pump wavelength, this can be done, for example, by changing the angular orientation of the non-linear crystal with respect to the pump radiation, or also by changing the crystal temperature. For a fixed crystal, the wavelengths of the signal and idler beams can also be tuned by changing the pump wavelength. An OPO is therefore a tunable source of coherent radiation. It is thus currently possible, for example when using β-barium borate (BBO) and when using the third harmonic of an Nd:YAG laser, for the wavelength of the signal radiation to be tuned (varied) in a range of between about 410 nm and 710 nm, the wavelength of the idler radiation being at the same time tuned in the range between 2500 nm and 710 nm.

U.S. Pat. No. 5,053,641 describes such a tunable source of coherent radiation having an OPO which uses a BBO crystal (β-BaB$_2$O$_4$) in the resonator. The pump pulse is focused by one of the two resonator mirrors into the optical non-linear crystal. The tuning (variation) of the wavelength of the output radiation takes place by rotating the crystal about an axis which is perpendicular to the optical axis of the resonator.

In U.S. Pat. No. 5,033,057, the arrangement was modified in such a way that two mirrors for input or output coupling of the pump radiation are arranged in the resonator of the OPO.

Both abovementioned OPO arrangements are characterized in that the bandwidth of the emitted OPO radiation is essentially determined by the spectral width of the optical parametric amplifier profile. This is true for both the signal and idler radiation. The spectral width of the amplifier profile is typically, for example when using BBO as amplifier medium, in the range of from about 5 to 50 cm$^{-1}$ depending on the wavelength.

U.S. Pat. No. 5,457,707 discloses an arrangement comprising two OPOs, in which a first OPO produces seed radiation for a second OPO. The latter is used as a power oscillator. A wavelength-selective element (a grating) is in this case arranged in the first OPO, that is to say the seed oscillator.

U.S. Pat. No. 5,365,366 describes an OPO whose output radiation is analyzed by means of a grating and a detector, in order to adjust the wavelength of the OPO (FIG. 7).

An article by V. Petrov and F. Noack in "Optics Letters", Vol. 20, No. 21, Nov. 1, 1995, pages 2171–2173 describes the analysis of the radiation of an OPA with the aid of a spectrometer.

In "Optics Letters", Vol. 20, No. 4, Feb. 15, 1995, pages 380–382, J. M. Boon-Engering et al. describe the analysis of the bandwidth of OPO radiation with the aid of a Fabry-Perot etalon.

In "J. Opt. Soc. Am. B", Vol. 10, No. 9, September 1993, pages 1744–1750, A. Fix et al. describe the analysis of OPO radiation with the aid of a grating spectrometer.

An article by M. J. Johnson et al. in "Optics Letters", Vol. 20, No. 11, Jun. 1, 1995, pages 1277–1279 describes a grating in Littrow arrangement, and, in "J. Opt. Soc. Am. B", Vol 10, No. 9, September 1993, pages 1716–1722, W. R. Bosenberg and D. R. Guyer describe a grating in Littman arrangement (grazing incidence) and a solid-state image sensor for radiation analysis.

For a multitude of applications, in particular in spectroscopy, it is desirable to have available tunable radiation whose spectral bandwidth is considerably smaller, for example less than 0.2 cm$^{-1}$ down to individual longitudinal modes having bandwidths in the region of 0.01 cm$^{-1}$ or less. The object of the present invention is to produce tunable coherent radiation with such small bandwidths.

In an article in J. Opt. Soc. Am. B. 10, 1716 (1993), W. R. Bosenberg et al. describe a narrow-band tunable OPO. In addition to the non-linear crystal, the resonator, which is excited with pulses, contains a grating as wavelength-selective element. The grating is used with grazing incidence.

The source, described in DE 42 19 169 A1 mentioned at the start, for producing tunable narrow-band coherent radiation has a first OPO, as a so-called seed oscillator, which contains no frequency selective elements for reducing the bandwidth in the resonator. A frequency-selective element is arranged outside the resonator and filters out a narrow spectral range from the relatively broad-band output radiation of the seed oscillator. This narrow-band radiation is then input into a second OPO which amplifies the radiation as a power oscillator.

In the arrangement according to DE 42 19 169 A1, grating losses or passive filter losses can be avoided by making the first OPO resonator as short as possible. In a short resonator of this type, only a few longitudinal modes are then excited, so that the total loss of useful radiation due to external spectral filtering can be reduced. With this known arrangement, it is therefore possible to reduce the external losses by making the seed OPO very short, so that the longitudinal modes of the resonator have a relatively large spacing. The total output energy is then discretely distributed over the individual excited modes, and the external spectral losses are decreased. In order, for example with an amplification bandwidth of 50 cm$^{-1}$, to reduce the losses due to the external spectral filtering to a factor of 50, only 50 longitudinal modes of the OPO resonator should be excited. This requires a mode spacing of 1 cm$^{-1}$ for the OPO resonator and means that the optical parametric amplifying medium must be shorter than 3.3 mm.

A further problem with this known OPO arrangement resides in the fact that the statistical nature of the excitation of the individual longitudinal modes, with both pulsed and continuous (cw) excitation, prohibits stable operation of the OPO. This is because the intensities of the individual longitudinal modes are subject to statistical laws, so that the energy contained in a mode oscillating with a particular wavelength also fluctuates statistically. Because of the spontaneous parametric processes, this so-called mode competition leads to energy fluctuations between the various modes. Energy fluctuations of this type can be up to 100%. This makes the energy stability of the output radiation which is delivered very poor.

If, with an arrangement according to DE 42 19 169 A1, the small bandwidth of the second optical parametric oscillator, achieved by the seeding, is to be adjusted (that is to say controlled or limited or monitored), the bandwidth being given by the number of modes still excited within the resonator amplification profile, then an expensive diagnosis system for analysing the narrow-band radiation emitted by the OPO is necessary. In this known arrangement, a diagnosis system of this type can be avoided (as also proposed therein), by de-adjusting the resonator of the second optical parametric oscillator in such a way that it does not oscillate mode-selectively. However, this solution has the disadvantage that it reduces both the beam quality of the emitted radiation of the second optical parametric oscillator and the efficiency of the latter.

The object of the invention is to provide a method for adjusting narrow-band coherent radiation and a source of such radiation, of the type mentioned at the start, which allow adjustment of the emitted radiation, in particular stabilization of the wavelength and bandwidth, with simple means and high efficiency of the source.

The method according to the invention for achieving this object is characterized in Patent claim 1. The source of narrow-band coherent radiation according to the invention is described in Patent claim 2.

The dependent claims describe preferred refinements of the method according to the invention and the source according to the invention.

The invention is thus preferably implemented with at least two optical parametric oscillators, one of the optical parametric oscillators producing seed radiation for the second optical parametric oscillator, and a wavelength-selective element being arranged between the two OPOs in order to spectrally restrict the bandwidth of the seed radiation of the seed OPO. According to the invention, the wavelength-selective element is at the same time also employed for the analysis (diagnosis) of the modes excited in the second OPO. The analysis of the radiation oscillating in the second OPO may, in particular, involve determining the number and wavelength of the modes excited in the second OPO. Using this measurement, it is then possible to control the second OPO in such a way that, for example, a minimal number of modes is excited by the seed radiation in the second OPO, in particular only one mode. For example, it is possible to track the length of the resonator of the second OPO using a control loop, so that, at any time, only a desired mode or a desired small number of modes is excited in the second OPO, and in this way the output radiation of the second OPO is stably kept at a specific frequency, and, this being the case, also stably has a specific bandwidth.

Independently of this stabilization, the wavelength of the emitted radiation can be tuned (controlled, adjusted) in conventional fashion.

The invention thus preferably provides for twofold use of the wavelength-selective element between the two OPOs, on the one hand for reducing the bandwidth of the seed radiation coupled into the second OPO, and on the other hand for analysis (diagnosis) of the radiation produced in the second OPO.

A grating is preferably chosen as the wavelength-selective element, in particular (approximately) in Littrow arrangement (grating almost in autocollimation) or else in Littman arrangement (grating under grazing incidence).

The first oscillator, which produces the seed radiation, need not necessarily be an OPO, and any source of sufficiently narrow-band seed radiation is suitable for this purpose. For example, a tunable solid-state laser, a tunable semiconductor laser or a tunable dye laser can be used as the seed oscillator.

Illustrative embodiments of the invention will be explained in more detail below with reference to the drawing, in which.

Figure 1:
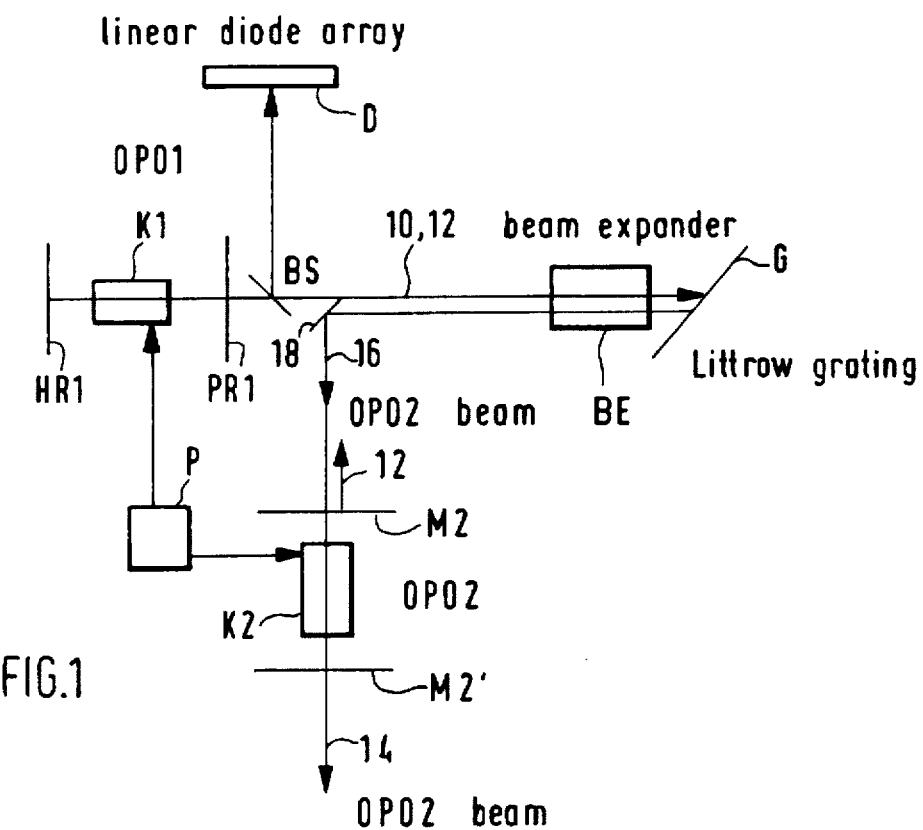
FIG. 1 shows a first illustrative embodiment of a source of narrow-band coherent radiation.

FIG. 1 shows a first optical parametric oscillator OPO 1, which is used as a seed oscillator. This oscillator has a first optical parametric amplifier medium K 1 in a resonator which is formed by the highly reflecting mirror HR 1 and the partially reflecting mirror PR 1. The OPO 1 is pumped, in a manner which is known per se, by a pump-radiation source P. Details of the pumping of the optical parametric amplifier medium K 1 (that is to say, for example, an OPO crystal) are not presented here since the pumping of the crystals can take place according to the prior art. This is also true as regards the crystal K 2, described further below, of the second optical parametric oscillator OPO 2.

The output radiation 10 of the first optical parametric oscillator OPO 1 is coupled out via the partially reflecting mirror PR 1 and passes through a beam splitter BS and, via a beam expander BE, known per se, to a grating, which is in Littrow arrangement (i.e. in autocollimation) in the illustrative embodiment according to FIG. 1.

By means of the grating G, the bandwidth of the seed radiation 10 is considerably restricted and the radiation output by the grating D is denoted by the reference number 16 in FIG. 1. This radiation 16, having small bandwidths, is coupled into a second optical parametric oscillator OPO 2. The OPO 2 contains a crystal K 2 as optical parametric amplifier medium, between two mirrors M 2 and M 2' which form a resonator. The radiation 16 coupled into the OPO 2 acts as seed radiation in the crystal K 2.

On account of the partial reflectivity of the mirrors M 2 and M 2' of the OPO 2, the OPO 2 outputs radiation on both sides, specifically: "forwards", the "actual" emitted laser beam 14, the wavelength and/or bandwidth of which are to be adjusted and/or stabilized, and, "backwards", a further OPO radiation 12 which, in terms of all properties of interest, in particular wavelength and bandwidth, corresponds exactly to the radiation 14 output "forwards". The radiation 12 of the OPO 2 which is output "backwards" is diverted into the beam expander BE via a mirror 18, and from there passes to the grating G and is diverted from there onto the partially transmitting mirror BS, where the radiation 12 is fully reflected and diverted onto a solid-state image sensor D in the form of a linear diode array (CCD arrangement).

The solid-state image sensor D in the form of, for example, a row of diodes, makes it possible to analyze the radiation 12 output by the OPO 2. A change in the wavelength of the output radiation due, for example, to the effects of temperature, is manifested by a radiation maximum on the linear diode array changing its position, which can be determined by an electronic evaluation unit (not shown). The analysis of the radiation 12 or 14 emitted by the OPO 2 allows adjustment of the OPO 2 such that the radiation 14 emitted by it is constant (stabilized) in terms of bandwidth and, in particular, is also restricted to only quite specific desired modes. As soon as the linear diode array D indicates a change in the radiation emitted by the OPO 2 (by spatial variation of radiation maxima) it is, for example, possible for the length of the resonator of the OPO 2 to be readjusted in control-loop fashion, in order to keep the emitted output radiation 14 to a desired wavelength and bandwidth. Details of the control loop, such as the electronic evaluation of the measurement data of the linear diode array D and the controlling of the length of the resonator of the OPO 2 are not represented in the figures, since these means are known per se to the person skilled in the art. On the basis of the analysis of the radiation, it is thus possible for a parameter of the OPO 2 and/or the wavelength selective element G to be adjusted. The solid-state image sensor D may preferably be a diode arrangement whose electrical output signal depends on the position where the radiation impinges on the diode arrangement. The diode arrangement is thus position-sensitive. A so-called double, or alternatively quadrant diode are, in particular, suitable examples. In the case of a double diode, at least two radiation-sensitive diodes are arranged in one direction (dimension), and a change in the position at which the radiation impinges on the diode arrangement is made perceptible by the fact that the output signal of one of the diodes increases, while the output signal of the other diode decreases. There is a similar mode of operation for a quadrant diode, known per se, in which at least two diodes are arranged in each of two mutually perpendicular directions, each functioning by itself as for the double diode just described.

FIG. 1 shows a particularly preferred way of coupling the radiation 12 used for the measurement out from the OPO 2. It is also possible to couple this radiation out at a different point, for example from the emitted radiation 14 by means of a partially reflecting mirror. In this variant of the illustrative embodiment according to FIG. 1 a small fraction of the radiation emitted forwards (FIGS. 1 and 2: downwards) is reflected out (using a suitable mirror) and sent into the wavelength-selective element and analyzed in terms of wavelength, in order, in accordance with the analysis result, to adjust the narrow-band output radiation 14 of the OPO 2.

FIG. 1 shows a preferred illustrative embodiment of an optical parametric oscillator OPO 1 for producing the seed radiation. In a variant of this example, it is also possible to provide a different tunable seed oscillator, for example based on a different solid-state laser or a dye laser.

FIG. 1 shows a grating as a preferred wavelength-selective element between the optical parametric oscillators. The essential point here is again only the function of the grating as a wavelength-selective element. Other wavelength-selective elements are also known to the person skilled in the art.

Figure 2:
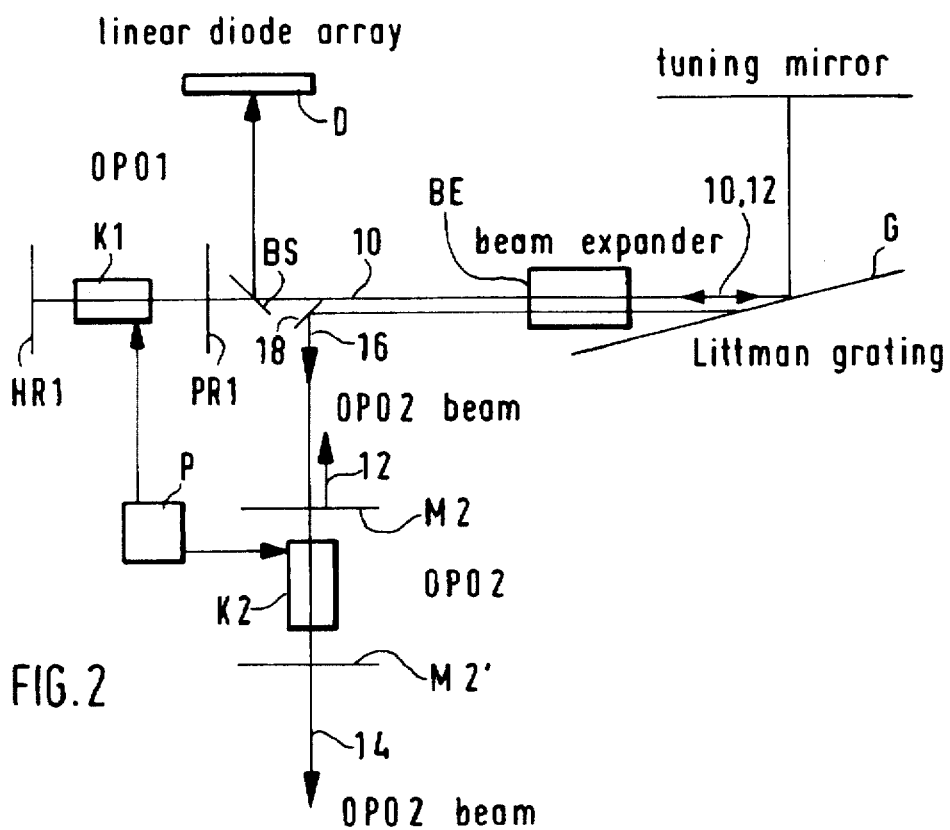
FIG. 2 shows a second illustrative embodiment of a source of narrow-band coherent radiation.

FIG. 2 shows a variant of the illustrative embodiment according to FIG. 1, the difference consisting in the fact that the grating G is in Littman arrangement in the example according to FIG. 2, that is to say it is operated with grazing incidence of the radiation. In other regards, components which correspond to one another or have the same function are given the same reference numbers, so that in this respect reference may be made to the description of FIG. 1.

Figure 3:
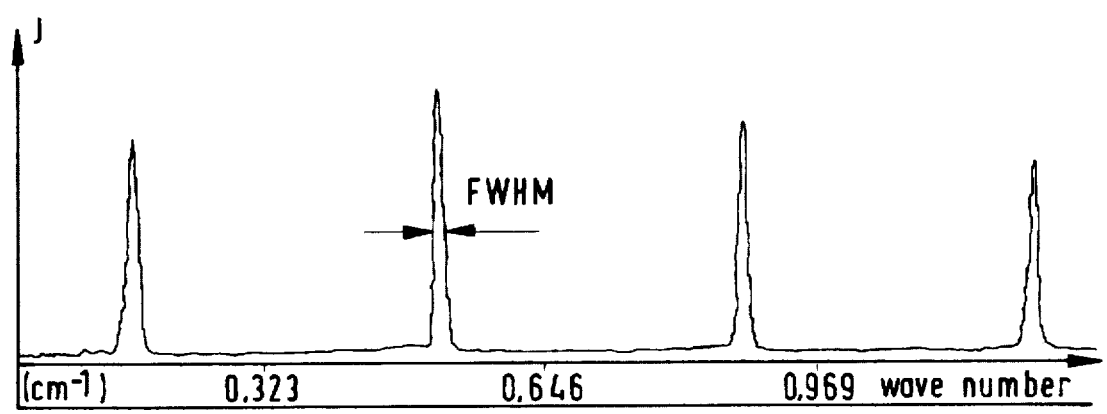
FIG. 3 shows measurement results which were obtained with an arrangement according to FIG. 1.

FIG. 3 shows measurement results which were obtained with a source of narrow-band coherent radiation according to FIG. 1. The wavelength of the emitted radiation 14 is 597 nm. The wave number in $cm^{-1}$ is plotted on the abscissa and the radiation intensity I of the radiation 14 is plotted in relative units on the ordinate. The full width at half maximum FWHM is 0.014.

The OPO 2 according to FIG. 1 is operated with a single longitudinal mode.

By rotating the grating G, the radiation emitted by the OPO 2 can be analyzed and adjusted.

We claim:

1. Method for adjusting narrow-band coherent radiation which is emitted by a source which has the following:
   a seed oscillator which emits radiation,
   a wavelength-selective element into which the radiation emitted by the seed oscillator is input in order to reduce or limit the bandwidth of this radiation,
   at least one optical parametric oscillator having at least one optical parametric amplifier medium in a resonator, into which output radiation of the wavelength-selective element is coupled, and
   at least one pump-radiation source for producing pump radiation and coupling it into the optical parametric oscillator comprising the steps of:
   inputting the radiation emitted by the optical parametric oscillator into the wavelength-selective element and into a means for analysing the radiation,
   analyzing the radiation; and
   adjusting, in accordance with the analysis, the wavelength-selective element and at the same time the narrowband radiation emitted by the optical parametric oscillator.

2. A method as recited in claim 1 wherein the pump radiation from the pump radiation source is coupled into the seed oscillator.

3. Source of narrow-band coherent radiation comprising:
   a seed oscillator which emits radiation,
   a wavelength-selective element into which the radiation emitted by the seed oscillator is input in order to reduce or limit the bandwidth of this radiation,
   at least one optical parametric oscillator having at least one optical parametric amplifier medium in a resonator, into which output radiation of the wavelength-selective element is coupled, and
   at least one pump-radiation source for producing pump radiation and coupling it into the optical parametric oscillator,
   means for inputting radiation emitted by the optical parametric oscillator into the wavelength-selective element, and
   means for analysing this radiation in order, in accordance with the analysis results, to adjust the radiation emitted by the optical parametric oscillator.

4. Source of narrow-band coherent radiation according to claim 3, characterized in that the wavelength-selective element is a grating.

5. Source as recited in claim 4 wherein said grating is a Littrow grating.

6. Source as recited in claim 4 wherein said grating is in a Littman arrangement.

7. Source of narrow-band coherent radiation according to claim 3, characterized in that the seed oscillator is an optical parametric oscillator.

8. Source of narrow-band coherent radiation according to claim 3, characterized in that the means for analysing the radiation have a solid-state image sensor.

9. Source of narrow-band coherent radiation according to claim 3, characterized in that the seed oscillator is a tunable solid-state laser.

10. Source of narrow-band coherent radiation according to claim 3, characterized in that the seed oscillator is a tunable semiconductor laser.

11. Source of narrow-band coherent radiation according to claim 3, characterized in that the seed oscillator is a tunable dye laser.

12. Source of narrow-band coherent radiation according to claim 3, characterized in that, as means for analysing the radiation, a diode arrangement is provided whose output signal depends on the position of the radiation incident on the diode arrangement.

13. Source as recited in claim 12 wherein said diode arrangement is a quadrant diode.

14. Source as recited in claim 3 wherein the pump radiation from the pump radiation source is coupled into the seed oscillator.

* * * * *